United States Patent
Radulescu

(10) Patent No.: US 8,544,511 B2
(45) Date of Patent: Oct. 1, 2013

(54) TIRE WITH APERTURED SHOULDER BLOCK FOR IMPROVED TEMPERATURE CONTROL

(75) Inventor: Robert C. Radulescu, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 414 days.

(21) Appl. No.: 12/864,201

(22) PCT Filed: Mar. 17, 2008

(86) PCT No.: PCT/US2008/057195
§ 371 (c)(1),
(2), (4) Date: Jul. 21, 2000

(87) PCT Pub. No.: WO2009/116987
PCT Pub. Date: Sep. 24, 2009

(65) Prior Publication Data
US 2011/0030863 A1 Feb. 10, 2011

(51) Int. Cl.
*B60C 11/01* (2006.01)
*B60C 13/02* (2006.01)
*B60C 11/117* (2006.01)

(52) U.S. Cl.
USPC .................. 152/209.16; 152/209.17; 152/153; 152/523

(58) Field of Classification Search
USPC .......... 152/154.2, 209.1, 209.3, 209.8, 209.9, 152/209.16, 209.17, 209.18, 209.25, 902, 152/153, 523
See application file for complete search history.

(56) References Cited

U.S. PATENT DOCUMENTS

| | | | |
|---|---|---|---|
| 1,509,259 A | 9/1924 | Rett et al. | |
| 1,877,988 A | 9/1932 | Schrank | |
| 2,121,955 A | 6/1938 | Eger | |
| 3,532,147 A * | 10/1970 | Gough et al. | ............ 152/209.16 |
| 6,371,179 B1 | 4/2002 | Tsuda | |
| 6,408,910 B1 | 6/2002 | Lagnier et al. | |
| 6,668,885 B2 | 12/2003 | Ishiyama | |
| 7,017,634 B2 | 3/2006 | Radulescu et al. | |
| D526,954 S | 8/2006 | Godeau | |
| 2005/0253304 A1 | 11/2005 | Menard | |
| 2006/0090827 A1 | 5/2006 | Merino Lopez | |

FOREIGN PATENT DOCUMENTS

| | | |
|---|---|---|
| DE | 29 34 524 A1 | 3/1981 |
| EP | 0 625 436 | 4/1994 |
| FR | 455938 | 3/1913 |
| FR | 1357078 | 2/1963 |

(Continued)

OTHER PUBLICATIONS

JP 02-034406, Feb. 1990, English language translation.*

(Continued)

*Primary Examiner* — Eric Hug
(74) *Attorney, Agent, or Firm* — Dority & Manning, P.A.

(57) ABSTRACT

A tire is provided having a plurality of shoulder blocks separated by axial grooves and located along at least one side of the tire. Apertures extend through the shoulder blocks to connect with a circumferential groove. The apertures are located within a certain radial position relative to the axial grooves. Each aperture has a bottom positioned at a radial depth $H_B$ relative to the shoulder block and extends completely through the shoulder block along the axial direction. Each aperture has a radial overlap $H_L$ with the axial grooves. The ratio $H_L/H_o$ is about 0.15 or less and the ratio of $H_B/H$ is in the range of about 1.0 to about 1.1.

17 Claims, 2 Drawing Sheets

(56) References Cited

FOREIGN PATENT DOCUMENTS

| | | | |
|---|---|---|---|
| JP | 02-034406 | * | 2/1990 |
| JP | 02034406 | | 2/1990 |
| JP | 02-310108 | A | 12/1990 |
| JP | 02-310109 | A | 12/1990 |
| JP | 02310107 | A | 12/1990 |
| JP | 05169913 | | 7/1993 |
| JP | 10-291405 | * | 11/1998 |
| JP | 10291405 | | 11/1998 |
| JP | 2003211455 | A | 7/2003 |
| JP | 2004-009886 | A | 1/2004 |
| WO | WO 00/00357 | A1 | 1/2000 |
| WO | WO 2007/039623 | A1 | 4/2007 |

OTHER PUBLICATIONS

PCT International Search Report for PCT/US08/057195, dated Aug. 5, 2008.

* cited by examiner

TIRE WITH APERTURED SHOULDER BLOCK FOR IMPROVED TEMPERATURE CONTROL

FIELD OF THE INVENTION

The present invention relates to a tire having a plurality of shoulder blocks separated by axial grooves and located along at least one side of the tire. Apertures extend through the shoulder blocks to connect with a circumferential groove. The apertures are located within a certain radial position relative to the axial grooves.

BACKGROUND OF THE INVENTION

Tires having holes, channels, or incisions extending from a lateral surface of the tire have been previously indicated. Such features can confer advantageous properties to a tire having tread of sufficient thickness. For example, channels can be provided that will emerge at the surface of the tread as wear proceeds so as to assist with traction on wet surfaces without sacrificing desirable properties of the tread when new. Channels can also provide ventilation and therefore a cooling effect for the tire.

By way of example, U.S. 2006/0090827 provides a tread having channels located along an offset rib. EP 0 625 436 shows an angled channel extending into part of the tread. U.S. Pat. No. 2,121,955 indicates incisions in a tire tread that are transverse to the rib. WO 00/00357 indicates channels extending under the tread features for removing medium away from the contact surface of the tire. U.S. 2005/0253304 indicates a process for placing a channel into the tire extending from the tire's lateral surface.

As set forth below, applicant has discovered an advantageous tire construction where apertures extend completely through a plurality of shoulder blocks and are positioned as herein described.

SUMMARY OF THE INVENTION

A summary of exemplary embodiments of the present invention will be set forth here. Using the description provided herein, one skilled in the art will understand that additional exemplary embodiments are within the scope of the present invention.

In one exemplary embodiment of the invention, a tire is provided having a circumferential groove of radial depth $H_o$, and a plurality of axial grooves of radial depth H and circumferential width W. A plurality of shoulder blocks are located circumferentially about at least one shoulder of the tire and have a height equal to radial depth $H_o$. The shoulder blocks are defined by the circumferential groove and the axial grooves. The axial grooves separate adjacent shoulder blocks. Each shoulder block has a circumferential length B. A plurality of apertures are positioned in the plurality of shoulder blocks.

At least one aperture is located within each shoulder block. Each aperture has a bottom positioned at a radial depth $H_B$ relative to the shoulder block and extends completely through the shoulder block along the axial direction. Each aperture has a radial overlap $H_L$ with the axial grooves. The ratio $H_L/H_o$ is about 0.15 or less and the ratio of $H_B/H$ is in the range of about 1.0 to about 1.1.

Additional features may be provided to this exemplary embodiment to create yet additional embodiments of the present invention. For example, for circumferential widths W of about 1 mm or more, the ratio of $H/H_o$ may be in the range of about 0.5 to about 0.9 or, even more particularly, the ratio of $H/H_o$ may be in the range of about 0.7 to about 0.9.

Each aperture defines a cross-sectional area $A_L$, and each said shoulder block defines a cross-sectional area of $B*H_o$. In certain embodiments, the ratio of $A_L/(B*H_o)$ is in the range of about 0.007 to about 0.05 or, even more particularly, the ratio of $A_L/(B*H_o)$ is in the range of about 0.01 to about 0.03.

In certain embodiments, the ratio of $B/H_o$ is in the range of about 1 to about 4 or, even more particularly, in the range of about 2 to about 3. The ratio $H_L/H_o$ may be about 0.1 or less. The ratio of $H_B/H_o$ may be about 1.0.

Each shoulder block has a least one aperture and may have several apertures. In certain embodiments, a tire according to the present invention has only two apertures along the shoulder block. The apertures may be substantially circular in cross-section but other shapes may also be employed. A plurality of lamellae may be provided for connecting the plurality of apertures with the outer radial surface of the tire.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE PREFERRED EMBODIMENTS

Figure 1:
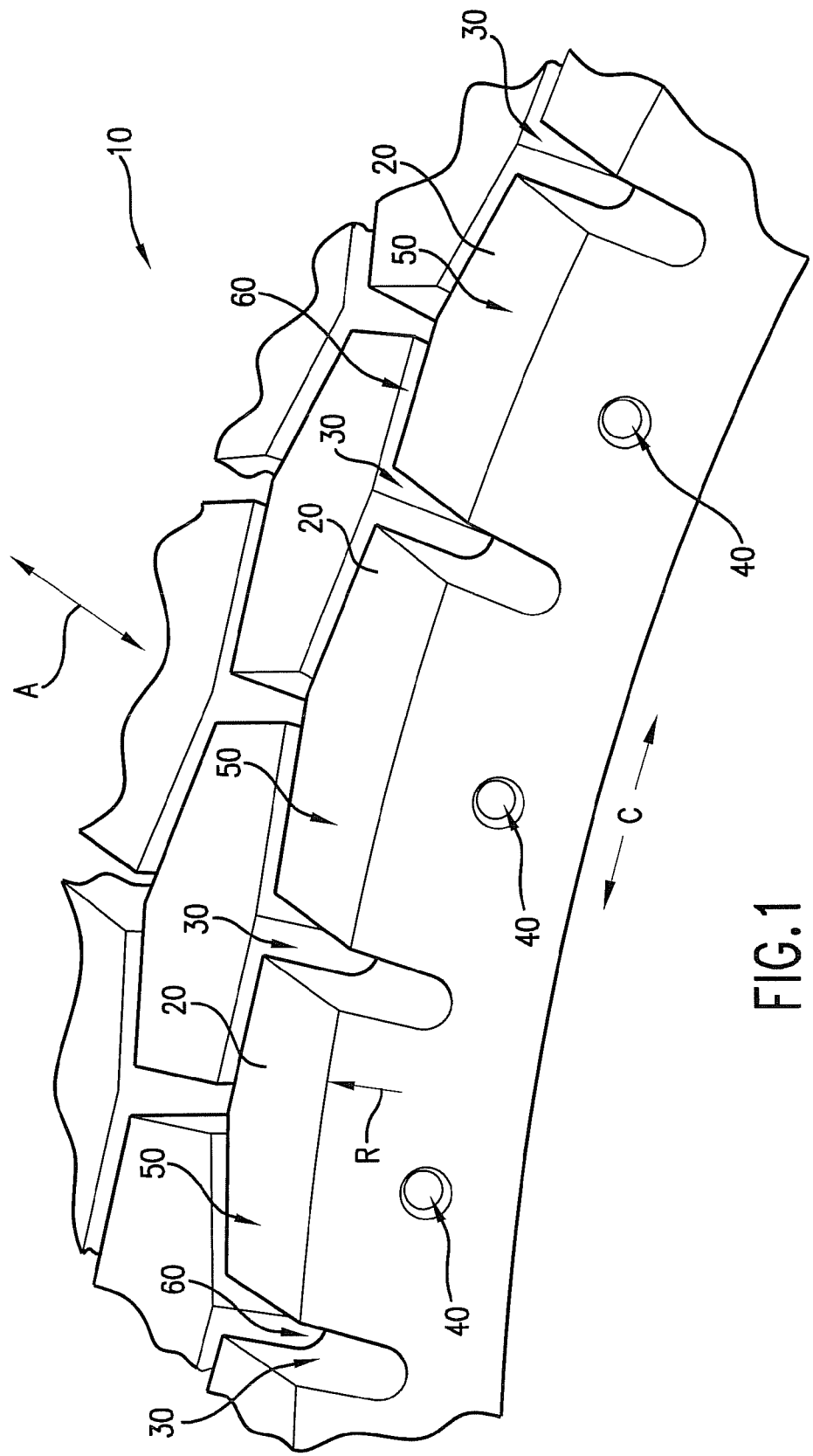
FIG. 1 is perspective view of a portion of a lateral surface and tread region of a tire according to an exemplary embodiment of the present invention.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 2:
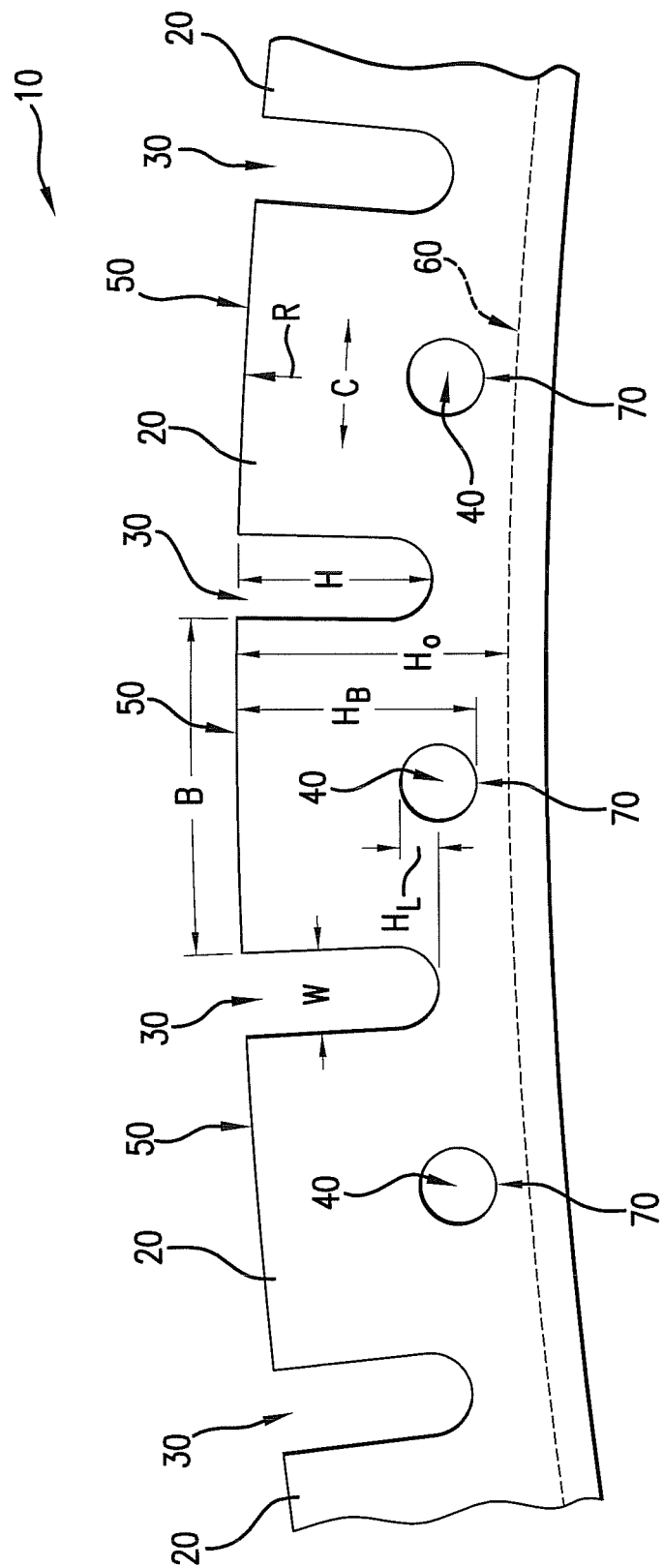
FIG. 2 is a schematic view of the exemplary tire of FIG. 1 as viewed from a lateral surface of the tire.

As used herein, the following terms have these definitions:

The term "radial" refers to the direction perpendicular to the axis of rotation of the tire as is designated with arrow R in FIGS. 1 and 2.

The term "axial" refers to the directions parallel to the axis of rotation of the tire and is designated with arrows A in FIG. 1.

The term "circumferential" refers to the circular direction defined by a radius of fixed length as it is rotated about the axis of rotation of the tire and is designated with arrows C FIGS. 1 and 2.

The term "lateral surfaces" refers to the outside surfaces along the sides of the tire.

A partial perspective view of an exemplary embodiment of a tire 10 according to the present invention is shown in FIG. 1. A schematic, side view of tire 10 is shown in FIG. 2. As depicted, tire 10 includes a plurality of shoulder blocks 20 separated by axial grooves 30, i.e., grooves oriented along the axial directions A. Each groove 30 has a width W along the circumferential direction C and depth H along radial direction R. Preferably, width W should be at least about 1 mm. Each shoulder block 20 has a length B along the circumferential direction C, which also represents the distance between grooves 30. Each shoulder block 20 is spaced circumferentially about the shoulder of tire 10 and is located adjacent to circumferential groove 60, which extends about the circumference of the tire separating shoulder blocks 20 from other tread features of the tire. As shown in FIG. 2, the depth of circumferential groove 60 is equal to radial depth $H_o$ and, with axial grooves 30, provides a shoulder block 20 having a height equal to radial depth $H_o$. Stated alternatively, each shoulder block 20 has a height relative to circumferential groove 60 that is equal to radial depth $H_o$. In general, the lengths B of blocks 20 ranges between about 1 to about 4 times radial depth $H_o$.

Each shoulder block 20 includes an aperture 40 that extends completely through block 20 along axial directions A. FIGS. 1 and 2 each depict a single aperture of circular cross-section that is positioned along the middle of each shoulder block 20. However, the present invention includes other configurations as provided in the claims that follow. By way of example, aperture 40 may have a non-circular cross-section and may be located at different locations along block 20. Additionally, more than one aperture 40 may be positioned within a block 20. For example, in one exemplary embodiment, block 20 includes two apertures with each having a circular cross-section. Blocks 20 having apertures 40 may be located on one or both sides of tire 10.

In general, the shoulder region of a tire can be provided with apertures that may facilitate traction and cooling as the tire is worn through operation. Improved cooling of the tire architecture may result as the apertures are moved relative to the tire's belts and/or carcass. More specifically, improvements in operating temperatures can result by moving apertures away from outer radial surface 50 and towards the center of the tire to increase the rate of heat transfer with air flowing through the apertures. However, as now set forth, applicant has determined that improvements in tire temperature and wear can be obtained by constructing a tire having apertures 40 within a specific location and configuration determined with regard to grooves 30 instead of the tire's belts and or carcass.

Referring to FIG. 2, each aperture 40 has a bottom 70 defined as the most radially-inward extent of aperture 40. Relative to outer radial surface 50, aperture bottom 70 is located at a radial depth $H_B$. Along radial direction R, grooves 30 should have a radial overlap $H_L$ with aperture 40. Furthermore, applicant has discovered improvements in temperature and endurance when the amount of radial overlap $H_L$ does not exceed about 15 percent of $H_o$. Additionally, radial depth $H_B$ should not exceed the depth H of groove 30 by more than about ten percent. Stated alternatively, the ratio $H_L/H_o$ should be about 0.15 or less, and the ratio $H_B/H$ should be in the range of about 1 to about 1.1. In still other exemplary embodiments of the present invention, the ratio of $H_L/H_o$ should be about 0.10 or less. Further, in still other exemplary embodiments, the ratio of $H_B/H$ should be about 1.

As stated, aperture 40 extends completely through block 20 to provide a path for air flow between the exterior of tire 10 and circumferential groove 60. Aperture 40 is otherwise not in direct communication with the exterior of tire 10. In certain embodiments, aperture 40 may be connected to the outer radial surface 50 of tire 10 by a lamella such as, for example, a lamella with a wavy or curved-shape along both axial direction A and radial direction R.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A tire having a pair of shoulders and defining axial, radial, and circumferential directions, the tire comprising:
   a circumferential groove of radial depth $H_o$;
   a plurality of axial grooves of radial depth H and circumferential width W;
   a plurality of shoulder blocks located circumferentially about at least one shoulder of the tire and having a height equal to radial depth $H_o$, said shoulder blocks defined by said circumferential groove and said axial grooves, wherein said axial grooves separate adjacent said shoulder blocks, each said shoulder block having a circumferential length B, and
   a plurality of apertures positioned in said plurality of shoulder blocks, wherein
   at least one aperture is located within each said shoulder block, each said aperture having a bottom positioned at a radial depth $H_B$ relative to said shoulder block and extending completely through said shoulder block along the axial direction, each said aperture having a radial overlap $H_L$ with said axial grooves;
   the ratio $H_L/H_o$ is about 0.15 or less and the ratio of $H_B/H$ is in the range of about 1.0 to about 1.1; and
   each said aperture defines a cross-sectional area $A_L$ each said shoulder block defines a cross-sectional area of $B*H_o$, and the ratio of $A_L/(B*H_o)$ is in the range of about 0.007 to about 0.05.

2. A tire as in claim 1, wherein for circumferential widths W of about 1 mm or more, the ratio of $H/H_o$ is in the range of about 0.5 to about 0.9.

3. A tire as in claim 1, wherein for circumferential widths W of about 1 mm or more, the ratio of $H/H_o$ is in the range of about 0.7 to about 0.9.

4. A tire as in claim 1, wherein each said aperture defines a cross-sectional area $A_L$, each said shoulder block defines a cross-sectional area of $B*H_o$, and the ratio of $A_L/(B*H_o)$ is in the range of about 0.01 to about 0.03.

5. A tire as in claim 1, wherein the ratio of $B/H_o$ is in the range of about 1 to about 4.

6. A tire as in claim 1, wherein the ratio of $B/H_o$ is in the range of about 2 to about 3.

7. A tire as in claim 1, wherein the ratio $H_L/H_o$ is about 0.1 or less.

8. A tire as in claim 7, wherein the ratio of $B/H_o$ is in the range of about 2 to about 3.

9. A tire as in claim 1, wherein the ratio of $B/H_o$ is in the range of about 1 to about 4.

10. A tire as in claim 9, wherein each said aperture defines a cross-sectional area $A_L$, each said shoulder block defines a cross-sectional area of $B*H_o$, and the ratio of $A_L/(B*H_o)$ is in the range of about 0.01 to about 0.03.

11. A tire as in claim 10, wherein each said shoulder block has no more than two said apertures.

12. A tire as in claim 11, wherein said apertures are substantially circular in cross-section.

13. A tire as in claim 12, wherein the tire has an outer radial surface, the tire further comprising a plurality of lamellae connecting said plurality of apertures with the outer radial surface of the tire.

14. A tire as in claim 1, wherein each said shoulder block has at least two said apertures.

15. A tire as in claim 1, wherein each said aperture is substantially circular in cross-section.

16. A tire as in claim 1, wherein the tire has an outer radial surface, the tire further comprising a plurality of lamellae connecting said plurality of apertures with the outer radial surface of the tire.

17. A tire as in claim 1, wherein the ratio of $H_B/H$ is about 1.0.

* * * * *